(12) United States Patent
Sato et al.

(10) Patent No.: US 10,965,022 B2
(45) Date of Patent: Mar. 30, 2021

(54) HIGH-FREQUENCY MODULE AND COMMUNICATION DEVICE

(71) Applicant: SONY SEMICONDUCTOR SOLUTIONS CORPORATION, Kanagawa (JP)

(72) Inventors: Masahiro Sato, Tokyo (JP); Takashi Kawamura, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/344,015

(22) PCT Filed: Oct. 19, 2017

(86) PCT No.: PCT/JP2017/037794
§ 371 (c)(1),
(2) Date: Apr. 22, 2019

(87) PCT Pub. No.: WO2018/100912
PCT Pub. Date: Jun. 7, 2018

(65) Prior Publication Data
US 2019/0341686 A1    Nov. 7, 2019

(30) Foreign Application Priority Data
Nov. 29, 2016    (JP) .............................. JP2016-231177

(51) Int. Cl.
*H01Q 1/52*        (2006.01)
*H01Q 23/00*      (2006.01)
*H01Q 1/24*        (2006.01)

(52) U.S. Cl.
CPC ............. *H01Q 1/526* (2013.01); *H01Q 1/525* (2013.01); *H01Q 23/00* (2013.01); *H01Q 1/246* (2013.01)

(58) Field of Classification Search
None
See application file for complete search history.

(56) References Cited

U.S. PATENT DOCUMENTS

2009/0015485 A1* 1/2009 Floyd .................. H01Q 21/065
                                                               343/700 MS
2013/0285857 A1 10/2013 Schultz et al.
(Continued)

FOREIGN PATENT DOCUMENTS

CN    101317268 A    12/2008
CN    104134649 A    11/2014
(Continued)

OTHER PUBLICATIONS

International Search Report and Written Opinion of PCT Application No. PCT/JP2017/037794, dated Jan. 9, 2018, 10 pages of ISRWO.
(Continued)

*Primary Examiner* — Anh Q Tran
(74) *Attorney, Agent, or Firm* — Chip Law Group

(57) ABSTRACT

[Object] To provide a high-frequency module and a communication device, each of which includes a non-directional antenna and is suitable for transmission/reception of a radio wave in a high frequency band. [Solution] A high-frequency module including: an antenna portion provided to project from a board; an antenna element at least a part of which is provided on the antenna portion; a transmission line formed on a same surface as the antenna element and including a same material as the antenna element; and a high-frequency element mounted on a surface of the board on which the transmission line is formed.

12 Claims, 9 Drawing Sheets

(56) References Cited

U.S. PATENT DOCUMENTS

| | | | | |
|---|---|---|---|---|
| 2014/0225795 A1* | 8/2014 | Yu | ....................... | H01Q 13/085 |
| | | | | 343/767 |
| 2014/0329476 A1 | 11/2014 | Yamamichi et al. | | |
| 2016/0056544 A1* | 2/2016 | Garcia | ..................... | H01Q 1/38 |
| | | | | 343/725 |

FOREIGN PATENT DOCUMENTS

| | | | |
|---|---|---|---|
| CN | 104576616 | A | 4/2015 |
| CN | 104966703 | A | 10/2015 |
| CN | 105552061 | A | 5/2016 |
| JP | 07-288415 | A | 10/1995 |
| JP | 2005-027134 | A | 1/2005 |
| JP | 2005-110109 | A | 4/2005 |
| JP | 2014-011769 | A | 1/2014 |
| JP | 2014-220593 | A | 11/2014 |
| WO | 2018/100912 | A1 | 6/2018 |

OTHER PUBLICATIONS

Office Action for CN Patent Application No. 201780072147.3 dated Nov. 5, 2020, 9 pages of Office Action and 10 pages of English Translation.

\* cited by examiner

HIGH-FREQUENCY MODULE AND COMMUNICATION DEVICE

CROSS REFERENCE TO RELATED APPLICATIONS

This application is a U.S. National Phase of International Patent Application No. PCT/JP2017/037794 filed on Oct. 19, 2017, which claims priority benefit of Japanese Patent Application No. JP 2016-231177 filed in the Japan Patent Office on Nov. 29, 2016. Each of the above-referenced applications is hereby incorporated herein by reference in its entirety.

TECHNICAL FIELD

The present disclosure relates to a high-frequency module and a communication device.

BACKGROUND ART

In recent years, antenna-integrated high-frequency modules capable of transmitting/receiving millimeter waves have been developed as antenna modules for next-generation mobile communication which transmit/receive radio waves in a higher frequency band.

For example, Patent Literature 1 cited below discloses a board for a radio frequency module, the board including a ground conductor layer formed on one surface of an insulating layer and having an opening, a conductor pattern formed on the other surface of the insulating layer so as to overlap the opening of the ground conductor layer, a dielectric layer formed on the ground conductor layer and including a porous material, and an antenna element formed on the dielectric layer so as to overlap the opening of the ground conductor layer.

In the board for a radio frequency module disclosed in Patent Literature 1, a radio wave is transmitted/received from the antenna element by electromagnetically joining the conductor pattern to the antenna element through the opening of the ground conductor layer. Patent Literature 1 discloses that directionality of the antenna element becomes high because the conductor pattern, the ground conductor layer, and the antenna element are laminated so as to overlap the opening of the ground conductor layer.

CITATION LIST

Patent Literature

Patent Literature 1: JP 2014-11769A

DISCLOSURE OF INVENTION

Technical Problem

However, an antenna of a terminal in mobile communication receives radio waves from base stations existing in various directions. Therefore, such an antenna of a terminal desirably has no directionality. Thus, the board for a radio frequency module disclosed in Patent Literature 1 is not suitable for a use in which non-directionality is demanded, such as an antenna of a terminal in mobile communication.

In view of this, there have been demanded a high-frequency module and a communication device, each of which is suitable for transmission/reception of a radio wave in a high frequency band and includes a non-directional antenna.

Solution to Problem

According to the present disclosure, there is provided a high-frequency module including: an antenna portion provided to project from a board; an antenna element at least a part of which is provided on the antenna portion; a transmission line formed on a same surface as the antenna element and including a same material as the antenna element; and a high-frequency element mounted on a surface of the board on which the transmission line is formed.

In addition, according to the present disclosure, there is provided a communication device including: an antenna portion provided to project from a board; an antenna element at least a part of which is provided on the antenna portion; a transmission line formed on a same surface as the antenna element and including a same material as the antenna element; a high-frequency element mounted on a surface of the board on which the transmission line is formed; and a device board provided on a surface of the board opposite the surface on which the high-frequency element is formed.

According to the present disclosure, the antenna portion including the antenna element is provided to project from the board, and therefore it is possible to isotropically reduce dielectric loss in a space around the antenna element. Further, it is possible to electrically connect the antenna element of the antenna portion and the high-frequency element with a short transmission line that hardly causes an impedance mismatch.

Advantageous Effects of Invention

As described above, according to the present disclosure, it is possible to provide a high-frequency module and a communication device, each of which includes a non-directional antenna and is suitable for transmission/reception of a radio wave in a high frequency band.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
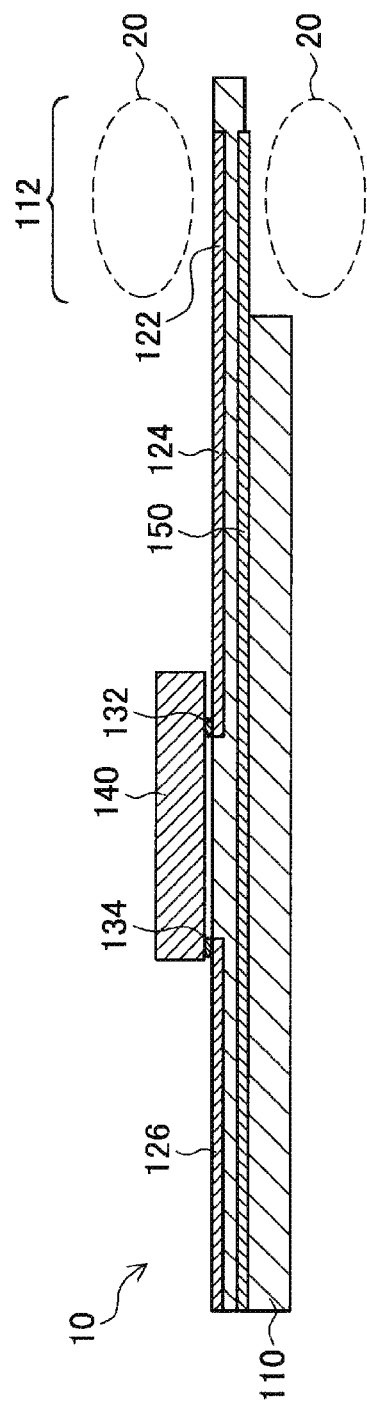
FIG. 1 is a cross-sectional view schematically illustrating a configuration of a high-frequency module according to a first embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. First embodiment
1.1. Configuration of high-frequency module
1.2. Use of high-frequency module
2. Second embodiment
3. Third embodiment
4. Conclusion

1. FIRST EMBODIMENT

1.1. Configuration of High-Frequency Module

First, a configuration of a high-frequency module according to a first embodiment of the present disclosure will be described with reference to FIGS. 1 and 2. FIG. 1 is a cross-sectional view schematically illustrating a configuration of a high-frequency module 10 according to the first embodiment of the present disclosure. Further, FIG. 2 is a plan view of the high-frequency module 10 illustrated in FIG. 1 seen from a high-frequency element 140 side.

Note that, in the present specification, the term "high frequency" indicates a frequency equal to or more than a frequency for use in mobile communication, such as 3G or 4G, and may indicate, for example, a frequency equal to or more than 20 GHz but equal to or less than 100 GHz.

Figure 2:
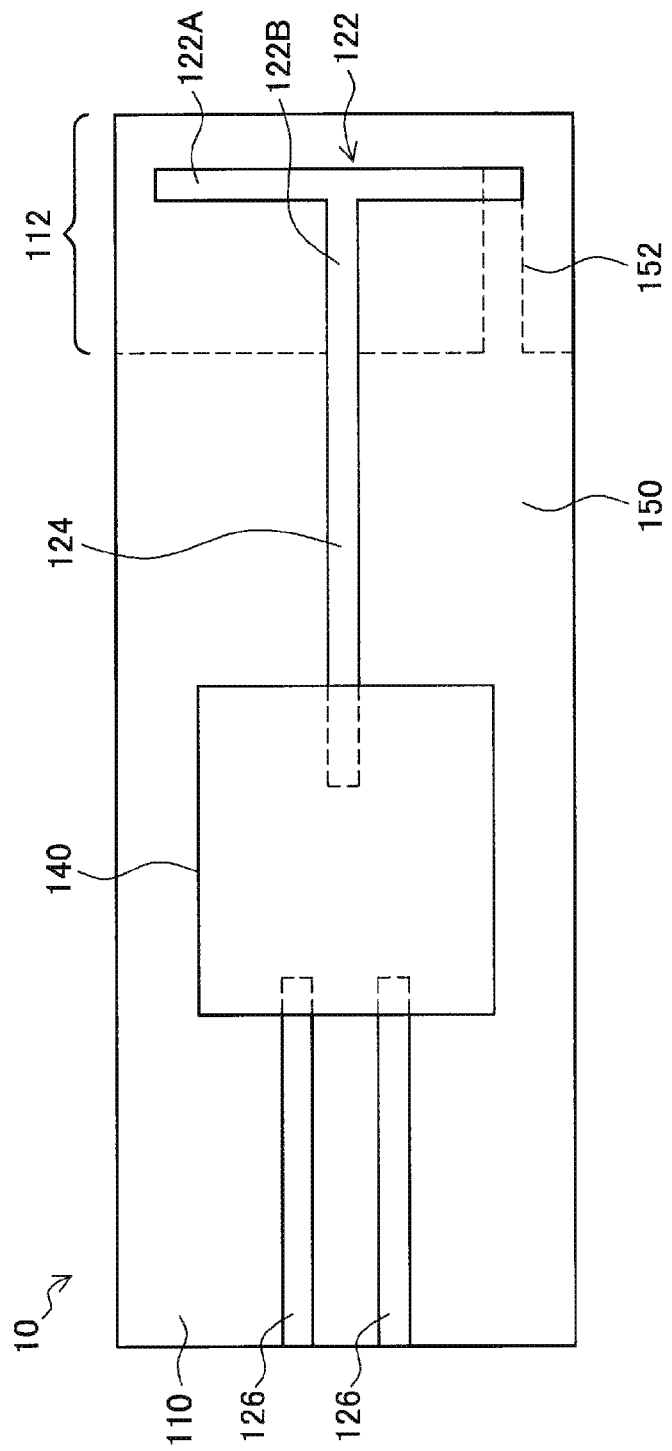
FIG. 2 is a plan view of the high-frequency module illustrated in FIG. 1 seen from a high-frequency element side.

As illustrated in FIGS. 1 and 2, the high-frequency module 10 includes a board 110, an antenna portion 112, an antenna element 122, a transmission line 124, two pieces of connection wiring 132 and 134, the high-frequency element 140, general wiring 126, and ground wiring 150.

The board 110 is a support on which each configuration of the high-frequency module 10 is provided. The board 110 may include a material having an excellent high frequency characteristic and may include, for example, ceramics such as low temperature co-fired ceramics (LTCC) or high temperature co-fired ceramics (HTCC), modified polyphenylene ether resin, bismaleimide triazine resin, polytetrafluoroethylene resin, polyimide resin, liquid crystal polymers, polynorbornene resin, epoxy resin, or a mixture of ceramics and organic resin.

The antenna portion 112 is provided to project from the board 110 and is configured as an antenna capable of transmitting/receiving a radio wave in a high frequency band. That is, the high-frequency module 10 is an antenna-integrated module in which the board 110 and the antenna portion 112 are integrated. The high-frequency module 10 is configured so that a part of the board 110 serves as the antenna portion 112, and therefore it is possible to simplify a structure and a manufacturing process thereof.

Herein, FIGS. 1 and 2 illustrate an example where the antenna portion 112 is configured as a reverse F-shape antenna.

As illustrated in FIGS. 1 and 2, the antenna portion 112 specifically includes the antenna element 122 and a short-circuiting line 152 electrically connected to the antenna element 122.

The antenna element 122 includes a main body portion 122A that extends in a direction vertical to a direction of projection of the antenna portion 112 from the board 110 and a feeder line 122B that electrically connects a substantially central portion of the main body portion 122A and the transmission line 124. The main body portion 122A performs radiation of a radio wave and the like. Further, the feeder line 122B supplies power to the main body portion 122A via the transmission line 124.

The short-circuiting line 152 is provided on a surface opposite a surface on which the antenna element 122 is provided and penetrates the board 110 to be electrically connected to one end of the main body portion 122A. The short-circuiting line 152 electrically connects the ground wiring 150 and the main body portion 122A, thereby grounding (also referred to as "earthing") the one end of the main body portion 122A.

The antenna element 122 is configured so that, in a case where a length of the main body portion 122A from an end at which the short-circuiting line 152 is not provided to an intersection with the feeder line 122B is set to A and a length of a part of the feeder line 122B projecting from the ground wiring 150 is set to B, a length of A+B is ¼ of an effective wavelength (hereinafter, also referred to as "effective wavelength $\lambda_e$") of a radio wave transmitted/received on the board 110. Such the antenna portion 112 can function as a reverse F-shape antenna.

However, the antenna portion 112 may be configured as an antenna of any shape and may be configured as, for example, a monopole antenna, a dipole antenna, a reverse L-shape antenna, or a dielectric antenna.

The antenna element 122 and the short-circuiting line 152 may include any material as long as the antenna element 122 and the short-circuiting line 152 are conductors such as metal and may include, for example, aluminum, iron, nickel, copper, silver, gold, platinum, or an alloy including those metals. Note that, although description will be provided below, the antenna element 122 is formed on the same surface as the transmission line 124 and the general wiring 126 and includes the same material thereas, and the short-circuiting line 152 is formed on the same surface as the ground wiring 150 and includes the same material thereas.

Herein, the antenna portion 112 is provided to project from the board 110, and therefore an air region 20 in which no member or the like is provided is formed above and below the antenna portion 112. With this, an equivalent dielectric constant around the antenna portion 112 is reduced, and therefore, in the antenna portion 112, it is possible to reduce dielectric loss of a radio wave to be transmitted/received. Therefore, in the antenna portion 112, radiation efficiency of a radio wave is improved and a frequency band of a transmittable/receivable radio wave is expanded. Further, a space around the antenna portion 112 is isotropic, and therefore the antenna portion 112 is configured as a non-directional antenna having low directionality.

The transmission line 124 electrically connects the antenna element 122 and the high-frequency element 140 via a connection wiring 132 and supplies power to the antenna element 122. Specifically, the transmission line 124 is formed so that the feeder line 122B of the antenna element 122 is extended to a part below the high-frequency element 140.

Therefore, the transmission line 124 is formed on the same surface of the board 110 as the antenna element 122 and includes the same material thereas so as to be integrated with the antenna element 122. In the high-frequency module 10, the connection wiring 132 connected to the high-frequency element 140 and the antenna element 122 are electrically connected via the transmission line 124 formed on the same surface as the antenna element 122 and including the same material thereas. This makes it possible to reduce power loss caused by transmission.

The transmission line 124 may be simultaneously formed with the antenna element 122 and the general wiring 126 by using, for example, sputtering, electroplating or electroless deposition, various kinds of printing processes, or the like. The transmission line 124 may include any material as long as the transmission line 124 is a conductor such as metal for use in general wiring and may include, for example, aluminum, iron, nickel, copper, silver, gold, platinum, or an alloy including those metals. The antenna element 122, the transmission line 124, and the general wiring 126 are formed on the same surface, and therefore, by simultaneously forming those configurations by the same process, it is possible to simplify a manufacturing process of the high-frequency module 10.

The two pieces of connection wiring 132 and 134 electrically connect the high-frequency element 140 mounted on the board 110 and the transmission line 124 or the general wiring 126 provided on the surface of the board 110. Specifically, the two pieces of connection wiring 132 and 134 are bumps, solders, vias, or the like and electrically connect a terminal of the high-frequency element 140 and the transmission line 124 or the general wiring 126. Note that the two pieces of connection wiring 132 and 134 may include general conductive materials for bumps, solders, or vias.

Further, height of the two pieces of connection wiring 132 and 134 may be ¼ or less of an effective wavelength (also referred to as "effective wavelength $\lambda_e$") of a radio wave transmitted/received by the antenna portion 112 on the board 110. According to this, the two pieces of connection wiring 132 and 134 can electrically connect the high-frequency element 140 and the transmission line 124 or the general wiring 126 not via wiring, wires, vias, or the like having a long distance that tends to cause an impedance mismatch. Therefore, because the height is set to ¼ or less of the effective wavelength $\lambda_e$, the two pieces of connection wiring 132 and 134 can reduce power loss caused by transmission.

The high-frequency element 140 is an electronic component provided at a preceding stage of the antenna element 122. For example, the high-frequency element 140 may be an electronic component including a circuit having a function of at least one of a high-frequency filter, a switch, a power amplifier, a low-noise amplifier, or the like. Further, the high-frequency element 140 may be provided so as to be subjectable to flip-chip joining onto the board 110. According to this, the high-frequency element 140 can electrically connect the transmission line 124 and the high-frequency element 140 via the shorter connection wiring 132 such as a bump or a solder.

The general wiring 126 is various kinds of wiring provided on the board 110. Specifically, the general wiring 126 is extended to a part below the high-frequency element 140 and is electrically connected to the high-frequency element 140 via the connection wiring 134. For example, the general wiring 126 may be wiring that electrically connects the high-frequency element 140 and a power supply, wiring that electrically connects the high-frequency element 140 and another electronic component, or the like.

The general wiring 126 as well as the transmission line 124 is formed on the same surface as the antenna element 122 and includes the same material thereas. The general wiring 126 may include any material as long as the general wiring 126 is a conductor such as metal for use in general wiring and may include, for example, aluminum, iron, nickel, copper, silver, gold, platinum, or an alloy including those metals. Further, the general wiring 126 as well as the transmission line 124 may be simultaneously formed with the antenna element 122 and the transmission line 124 by using, for example, sputtering, electroplating or electroless deposition, various kinds of printing processes, or the like. Therefore, by simultaneously forming the antenna element 122, the transmission line 124, and the general wiring 126 by the same process, it is possible to simplify the manufacturing process of the high-frequency module 10.

The ground wiring 150 is wiring connected to a reference potential (not illustrated) (i.e. grounded). For example, the short-circuiting line 152 is grounded (i.e. earthed) by being electrically connected to the ground wiring 150.

The ground wiring 150 may be grounded by being electrically connected to, for example, a metal portion (not illustrated) or the like of a housing of an electronic device including the high-frequency module 10. Further, the ground wiring 150 may be configured as a ground plate that is large enough to form an equipotential surface to thereby function as a ground. The ground wiring 150 may include any material as long as the ground wiring 150 is a conductor such as metal for use in general wiring and may include, for example, aluminum, iron, nickel, copper, silver, gold, platinum, or an alloy including those metals.

The high-frequency module 10 including the configurations described in the above description includes the non-directional antenna portion 112 and can transmit/receive a radio wave in a high frequency band.

Generally, loss caused by a transmission path tends to be larger as a frequency of a transmitted/received radio wave is higher. However, in the high-frequency module 10, a transmission path from the antenna element 122 to the high-frequency element 140 can be formed shorter so as to cause no impedance mismatch. Therefore, in the high-frequency module 10, it is possible to reduce power loss in the transmission path. Thus, it is possible to transmit/receive a radio wave in a high frequency band more efficiently.

Note that the above-mentioned high-frequency module 10 can be manufactured by using a general manufacturing technology of electronic components. Such a general manufacturing technology of electronic components is obvious to a so-called person skilled in the art, and therefore description thereof is herein omitted.

1.2. Use of High-Frequency Module

Figure 3:
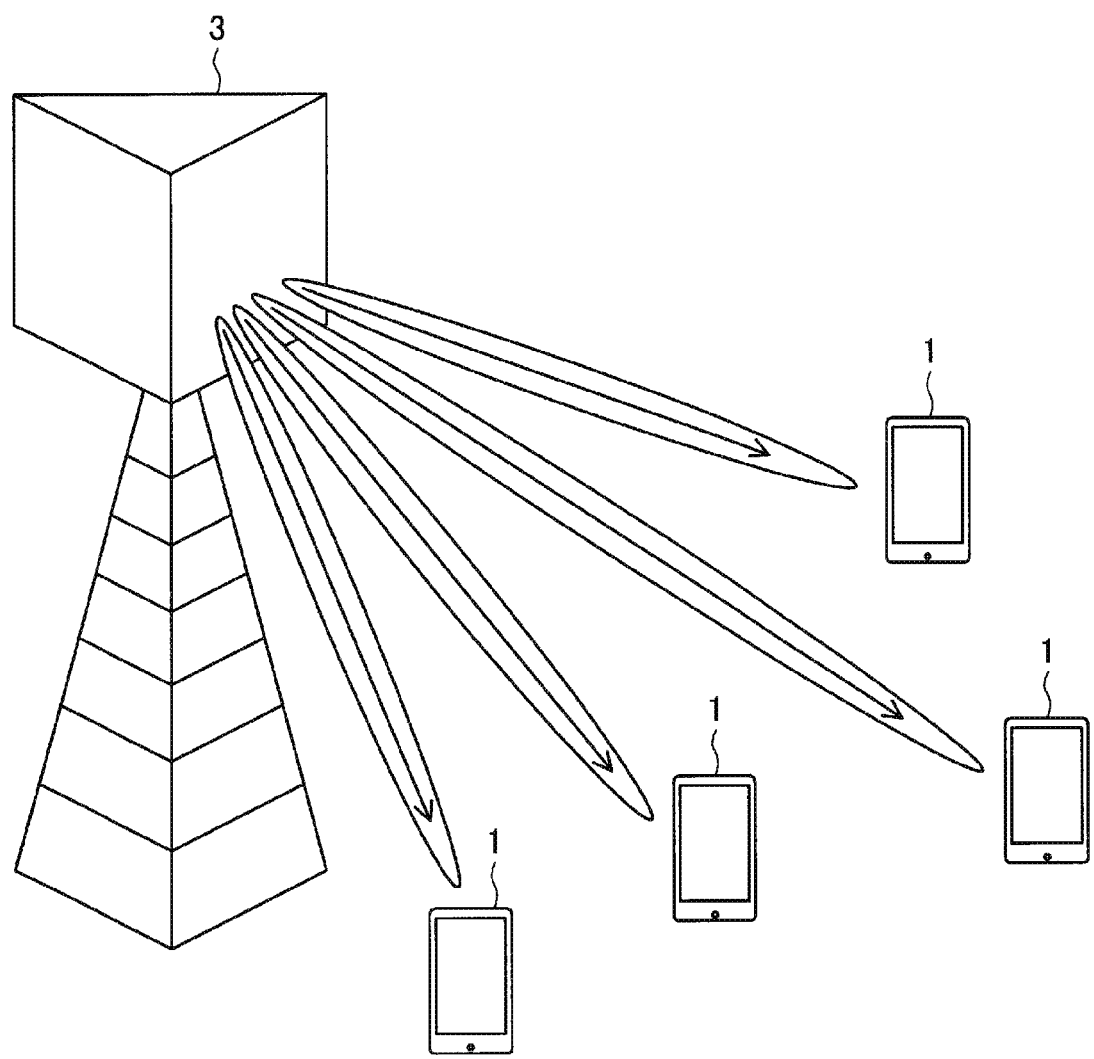
FIG. 3 is an explanatory diagram illustrating a use of the high-frequency module according to this embodiment.

Next, a use of the high-frequency module 10 according to the present embodiment will be described with reference to FIG. 3. FIG. 3 is an explanatory diagram illustrating a use of the high-frequency module 10 according to the present embodiment.

As illustrated in FIG. 3, the high-frequency module 10 according to the present embodiment is included in, for example, a terminal 1 that performs mobile communication with a base station 3 and transmits/receives a radio wave in a high frequency band. The frequency band of the radio wave transmitted/received between the base station 3 and the terminal 1 is, for example, a high frequency band of 20 GHz to 100 GHz.

The base station 3 is provided in each place at predetermined intervals and transmits/receives radio waves to/from terminals 1 in a range under the charge of the base station 3. An antenna included in the base station 3 may have non-directionality or may have high directionality. Further, the antenna included in the base station 3 may be an antenna array in which a plurality of antenna elements is regularly arranged on a flat surface.

The terminal 1 is, for example, a mobile phone, a tablet terminal, a smartphone, or the like and transmits/receives a radio wave to/from the closest base station 3. Herein, the terminal 1 desirably includes a non-directional antenna because the terminal 1 receives radio waves from the base stations 3 existing in various directions. The high-frequency module 10 according to the present embodiment includes a non-directional antenna that can transmit/receive a radio wave in a high frequency band and can therefore be suitably used in the terminal 1 that performs mobile communication.

2. SECOND EMBODIMENT

Figure 4:
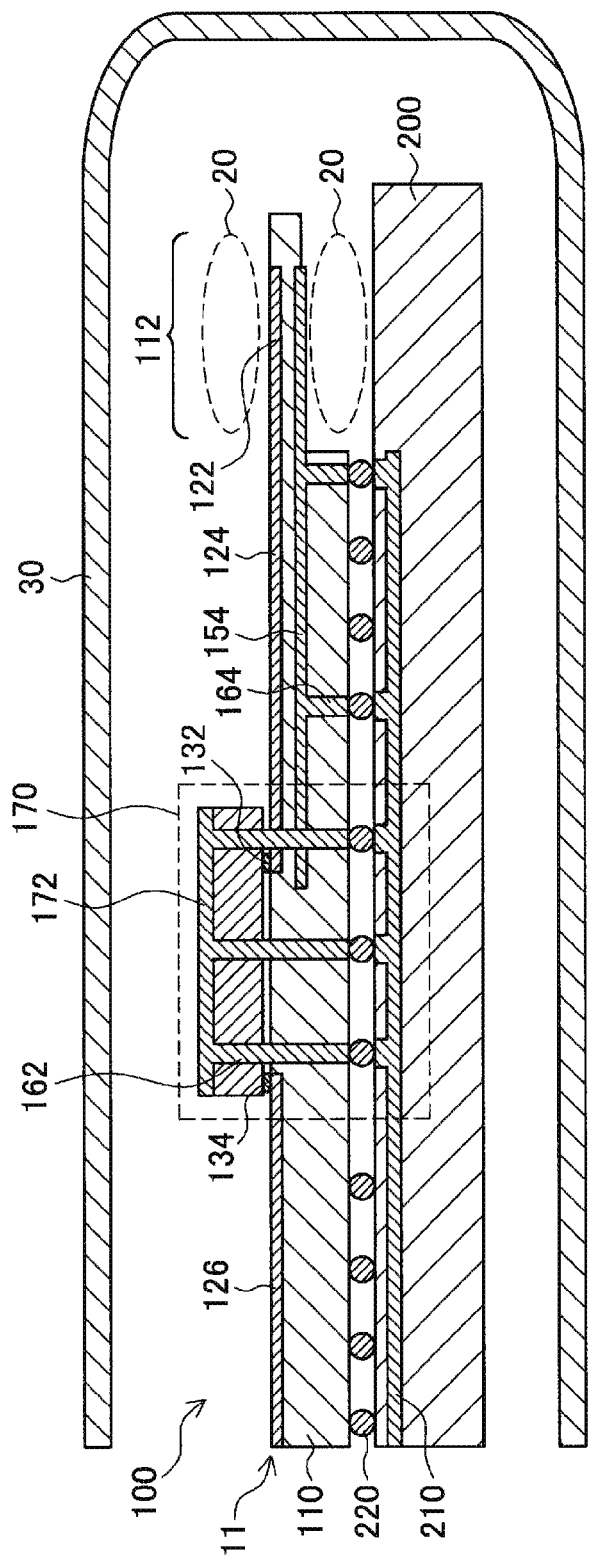
FIG. 4 is a cross-sectional view schematically illustrating a configuration of a communication device according to a second embodiment of the present disclosure.

Next, a configuration of a communication device 100 according to a second embodiment of the present disclosure will be described with reference to FIGS. 4 and 5. FIG. 4 is a cross-sectional view schematically illustrating the configuration of the communication device 100 according to the second embodiment of the present disclosure. Further, FIG. 5 is a plan view of the communication device 100 illustrated in FIG. 4 seen from the high-frequency element 140 side.

Figure 5:
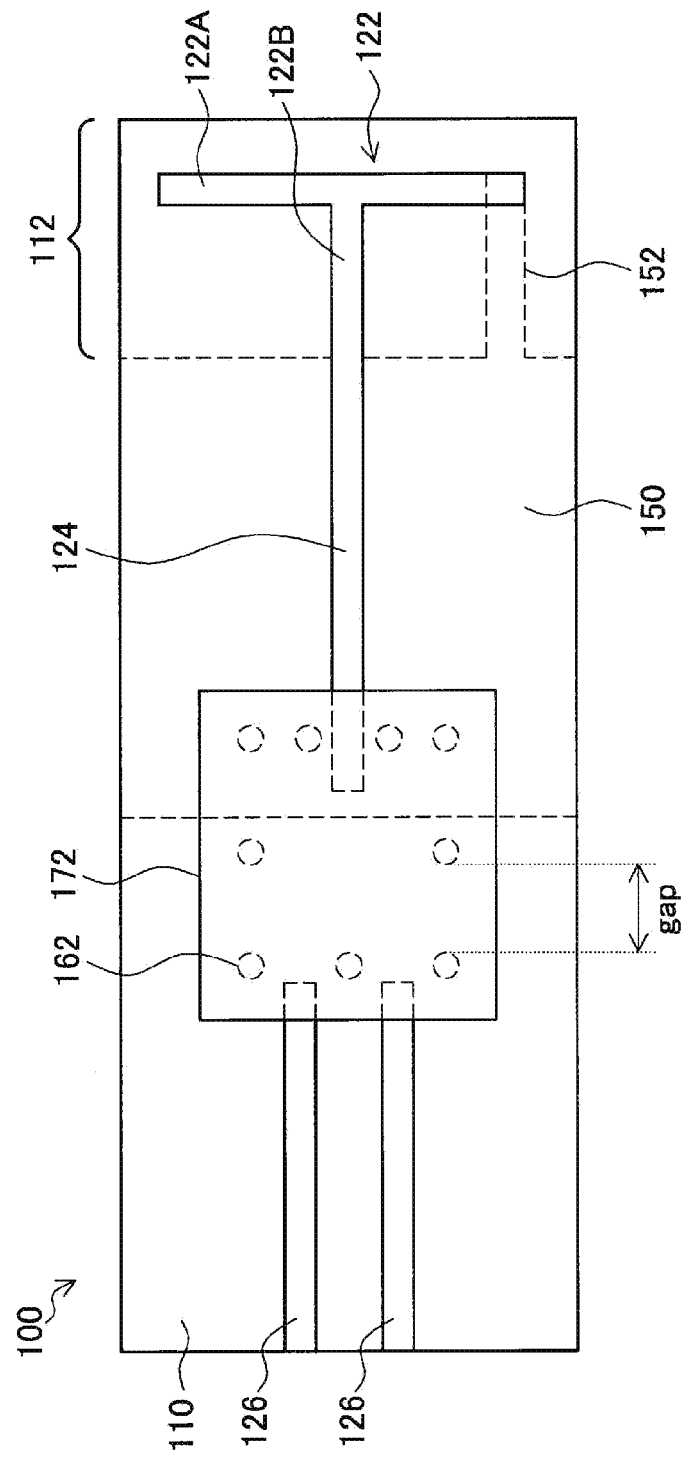
FIG. 5 is a plan view of the communication device illustrated in FIG. 4 seen from a high-frequency element side.

As illustrated in FIGS. 4 and 5, the communication device 100 includes a high-frequency module 11 and a device board 200 on which the high-frequency module 11 is mounted. Further, the communication device 100 is included in, for example, a housing 30 of the terminal 1 that performs mobile communication.

The high-frequency module 11 includes the board 110, the antenna portion 112, the antenna element 122, the transmission line 124, the two pieces of connection wiring 132 and 134, the high-frequency element 140, the general wiring 126, ground wiring 154, ground vias 162 and 164, and an upper shield 172. Further, the device board 200 includes a board ground 210 and is connected to the high-frequency module 11 via solders 220.

In the communication device 100 according to the present embodiment, the upper shield 172, the ground vias 162, and the board ground 210 surround the high-frequency element 140 in all directions and therefore function as a shield portion 170 that blocks out a radio wave to enter the high-frequency element 140. With this, in the communication device 100, it is possible to restrain occurrence of noise in the high-frequency element 140.

The board 110, the antenna portion 112, the antenna element 122, the transmission line 124, the two pieces of connection wiring 132 and 134, the high-frequency element 140, and the general wiring 126 are substantially similar to those in the first embodiment, and therefore detailed description thereof is herein omitted. Hereinafter, characteristic configurations of the second embodiment will be mainly described.

The board 110 is a support on which each configuration of the high-frequency module 11 is provided. The board 110 may include a material similar to that in the first embodiment.

The antenna portion 112 is configured as an antenna that is provided to project from the board 110 and is capable of transmitting/receiving a radio wave in a high frequency band. The antenna portion 112 is provided to project from the board 110, and therefore it is possible to form the air region 20 having a low dielectric constant above and below the antenna portion 112. With this, the antenna portion 112 can improve radiation efficiency of a radio wave and expand a transmittable/receivable frequency band. Further, with such a configuration, the antenna portion 112 is configured as a non-directional antenna having low directionality.

The antenna portion 112 may be configured as any antenna and may be configured as a reverse F-shape antenna as in the first embodiment. Further, the antenna element 122 may also have a flat surface shape as in the first embodiment.

The transmission line 124 electrically connects the high-frequency element 140 and the antenna element 122 and supplies power to the antenna element 122 as in the first embodiment. The transmission line 124 is formed on the same surface as the antenna element 122 and includes the same material thereas as in the first embodiment, and therefore it is possible to reduce power loss caused by transmission by reducing a transmission distance.

Further, the transmission line 124 may be simultaneously formed with the antenna element 122 and the general wiring 126 formed on the same surface by the same process. According to this, it is possible to simplify a manufacturing process of the high-frequency module 11 because of the transmission line 124.

The two pieces of connection wiring 132 and 134 electrically connect the high-frequency element 140 mounted on the board 110 and the transmission line 124 or the general wiring 126 provided on the surface of the board 110 as in the first embodiment. For example, the two pieces of connection wiring 132 and 134 may be bumps, solders, vias, or the like. Further, the height of the two pieces of connection wiring 132 and 134 may be ¼ or less of the effective wavelength $\lambda_e$ of a radio wave transmitted/received by the antenna portion 112. According to this, the two pieces of connection wiring 132 and 134 can reduce power loss caused by transmission.

The high-frequency element 140 may be, for example, an electronic component including a circuit having a function of at least one of a high-frequency filter, a switch, a power amplifier, a low-noise amplifier, or the like as in the first embodiment.

Further, in the communication device 100 according to the present embodiment, the high-frequency element 140 is surrounded by the shield portion 170 including the upper shield 172, the ground vias 162, and the board ground 210. With this, the high-frequency element 140 is shielded by the shield portion 170 from an external radio wave, and therefore it is possible to restrain occurrence of noise in the circuit. Note that a radio wave blocked out by the shield portion 170 may be, for example, a radio wave transmitted/received by the antenna portion 112, a higher harmonic wave of the radio wave, and the like. Specifically, the shield portion 170 may block out a radio wave in a frequency band of 20 GHz to 200 GHz.

Such the shield portion 170 is, for example, a conductor having an opening whose size is ¼ or less of an effective wavelength (also referred to as "effective wavelength $\lambda_e$") of a radio wave to be blocked out on the board 110 and is configured to surround a target to be shielded in all directions.

The general wiring 126 is various kinds of wiring provided on the board 110 as in the first embodiment. Further, the general wiring 126 is electrically connected to the high-frequency element 140 by the connection wiring 134. For example, the general wiring 126 may be formed on the same surface as the antenna element 122 and the transmission line 124 and includes the same material thereas. Further, the general wiring 126 may be simultaneously formed with the antenna element 122 and the transmission line 124 by the same process. According to this, it is possible to further simplify a configuration and a manufacturing process of the communication device 100.

The ground wiring 154 is wiring connected to a reference potential (i.e. grounded). Specifically, the ground wiring 154 is grounded by being electrically connected to the board ground 210 by the ground vias 164 provided to penetrate the board 110 and the solders 220. Note that the ground wiring 154 may include a material similar to that in the first embodiment.

The ground vias 162 are provided to penetrate the high-frequency element 140 and the board 110 and constitute the shield portion 170 together with the upper shield 172 and the board ground 210, thereby blocking out a radio wave to enter the high-frequency element 140. Specifically, the ground vias 162 are provided along a periphery of the high-frequency element 140 at intervals of a predetermined width gap or less.

A size of the predetermined width gap may be, for example, ¼ of the effective wavelength $\lambda_e$ (i.e. the effective wavelength on the board 110) of a radio wave to be blocked out by the shield portion 170. Note that, in order to further improve ability of the ground vias 162 blocking out radio waves, the size of the predetermined width gap may be ¹⁄₁₀ of the effective wavelength $\lambda_e$ of a radio wave to be blocked out by the shield portion 170. For example, in a case where the radio wave to be blocked out by the shield portion 170 is a radio wave in a frequency band of 20 GHz to 100 GHz, the size of the predetermined width gap may be set to 0.75 mm and may desirably be set to 0.3 mm.

Such predetermined width gap is sufficiently smaller than an effective wavelength of a radio wave to be blocked out. Therefore, the radio wave to be blocked out cannot pass through a gap between the ground vias 162 provided at intervals of the predetermined width gap or less, and the ground vias 162 can block out a radio wave to enter the high-frequency element 140 through a side surface.

The ground vias 162 may be configured as conductors for use in general wiring or electrodes and may include, for example, a metal such as copper, aluminum, titanium, or tungsten or an alloy of those metals.

The ground vias 164 are provided to penetrate the board 110 and electrically connect the ground wiring 154 and the board ground 210 via the solders 220. With this, the ground vias 164 can ground the ground wiring 154. Although at least one ground via 164 needs to be provided, a plurality of ground vias 164 may be provided. In a case where a plurality of ground vias 164 is provided, electrical connection between the ground wiring 154 and the board ground 210 can be reinforced, and therefore it is possible to improve stability of grounding the ground wiring 154 and the like. The ground vias 164 may be configured as conductors for use in general vias or electrodes and may include, for example, a metal such as copper, aluminum, titanium, or tungsten or an alloy of those metals.

The upper shield 172 is a conductor layer provided on a surface of the high-frequency element 140 opposite a surface via which the high-frequency element 140 is mounted on the board 110 (i.e. an upper surface of the high-frequency element 140). The upper shield 172 is provided on the whole upper surface of the high-frequency element 140, and therefore it is possible to block out a radio wave to enter the high-frequency element 140 through the upper surface. Further, the upper shield 172 can also reduce source inductance of a transistor included in the high-frequency element 140. The upper shield 172 may include any material as long as the upper shield 172 is a conductor such as metal and may include, for example, aluminum, iron, nickel, copper, silver, gold, platinum, or an alloy including those metals.

The device board 200 is a support on which each configuration of the communication device 100 including the high-frequency module 11 is mounted. For example, the device board 200 may include organic resin such as epoxy resin, polyimide resin, modified polyphenylene ether resin, phenol resin, polytetrafluoroethylene resin, silicon resin, polybutadiene resin, polyester resin, melamine resin, urea resin, polyphenylene sulfide resin, or polyphenylene oxide resin. Further, in order to improve mechanical stiffness, glass fibers or the like may be mixed with the organic resin from which the device board 200 is made. Furthermore, the device board 200 may be configured as a multilayer wiring board including a plurality of layers.

The solders 220 electrically connect wiring formed on the high-frequency module 11 and wiring formed on the device board 200. Specifically, the solders 220 electrically connect the ground vias 162 and 164 and the board ground 210. With this, the ground vias 162 and 164, the upper shield 172, and the ground wiring 154 are grounded by the board ground 210. Further, the solders 220 may electrically connect the general wiring 126 formed on the high-frequency module 11 and wiring (not illustrated) formed on the device board 200.

For example, the solders 220 may be solder balls constituting a ball grid array (BGA), Cu core solder balls for three-dimensional mounting such as package on package (POP), or Cu pillar bumps in which solders are capped on pillar-shaped copper.

The board ground 210 is wiring provided on the device board 200 and connected to a reference potential (not illustrated) (i.e. grounded). The ground vias 162 and 164, the upper shield 172, and the ground wiring 154 are grounded by being electrically connected to the board ground 210. The board ground 210 may be grounded by being electrically connected to, for example, a metal portion (not illustrated) or the like of the housing 30 of the electronic device including the communication device 100. Further, the board ground 210 may be configured as a ground plate that is large enough to form an equipotential surface to thereby function as a ground.

Further, the board ground 210 may be provided on a projection region obtained by seeing at least the upper shield 172 in a plan view. The board ground 210 is provided on the whole flat region of the high-frequency element 140, and therefore it is possible to block out a radio wave to enter the high-frequency element 140 through the device board 200. That is, the board ground 210 surrounds the high-frequency element 140 together with the ground vias 162 and the upper shield 172 in a cage shape and can therefore function as the shield portion 170 that blocks out a radio wave to enter the high-frequency element 140.

Further, the board ground 210 does not need to be provided below the antenna portion 112. In such a case, a space above and below the board 110 of the antenna portion 112 is more isotropic, and therefore it is possible to further improve non-directionality of the antenna portion 112.

The board ground 210 may include any material as long as the board ground 210 is a conductor such as a metal for use in general wiring and may include, for example, aluminum, iron, nickel, copper, silver, gold, platinum, or an alloy including those metals.

FIGS. 4 and 5 illustrate an example where the shield portion 170 includes the upper shield 172, the ground vias 162, and the board ground 210. However, the present embodiment is not limited to such an example. The shield portion 170 may include a conductor layer (e.g. the ground wiring 154 or the like) provided on any one of the board 110 and the device board 200, instead of the board ground 210.

For example, the shield portion 170 may include the upper shield 172, the ground vias 162, and a conductor layer (e.g. the ground wiring 154) provided on the board 110 in the projection region obtained by seeing the upper shield 172 in a plan view. Further, the shield portion 170 may include the upper shield 172, the ground vias 162, and a conductor layer provided on the device board 200 in the projection region obtained by seeing the upper shield 172 in a plan view.

Also in such a case, the upper shield 172, the ground vias 162, and the conductor layer can surround the high-frequency element 140 in a cage shape and can therefore function as the shield portion 170 that blocks out a radio wave to enter the high-frequency element 140. Note that, in such a case, the shield portion 170 is not grounded. However, this is not particularly problematic.

Meanwhile, in a case where the shield portion 170 includes the upper shield 172, the ground vias 162, and the board ground 210, the board ground 210 can be used as a shield from a radio wave passing through the device board 200, without providing an additional conductor layer. This makes it possible to simplify the configuration and the manufacturing process of the communication device 100.

The communication device 100 including the configurations described above includes the non-directional antenna portion 112, has low loss caused by a transmission path, and can transmit/receive a radio wave in a high frequency band more efficiently.

Note that the above-mentioned communication device 100 can be manufactured by using a general manufacturing technology of electronic components. Such a general manufacturing technology of electronic components is obvious to a so-called person skilled in the art, and therefore description thereof is herein omitted.

Modification Example

Figure 6:
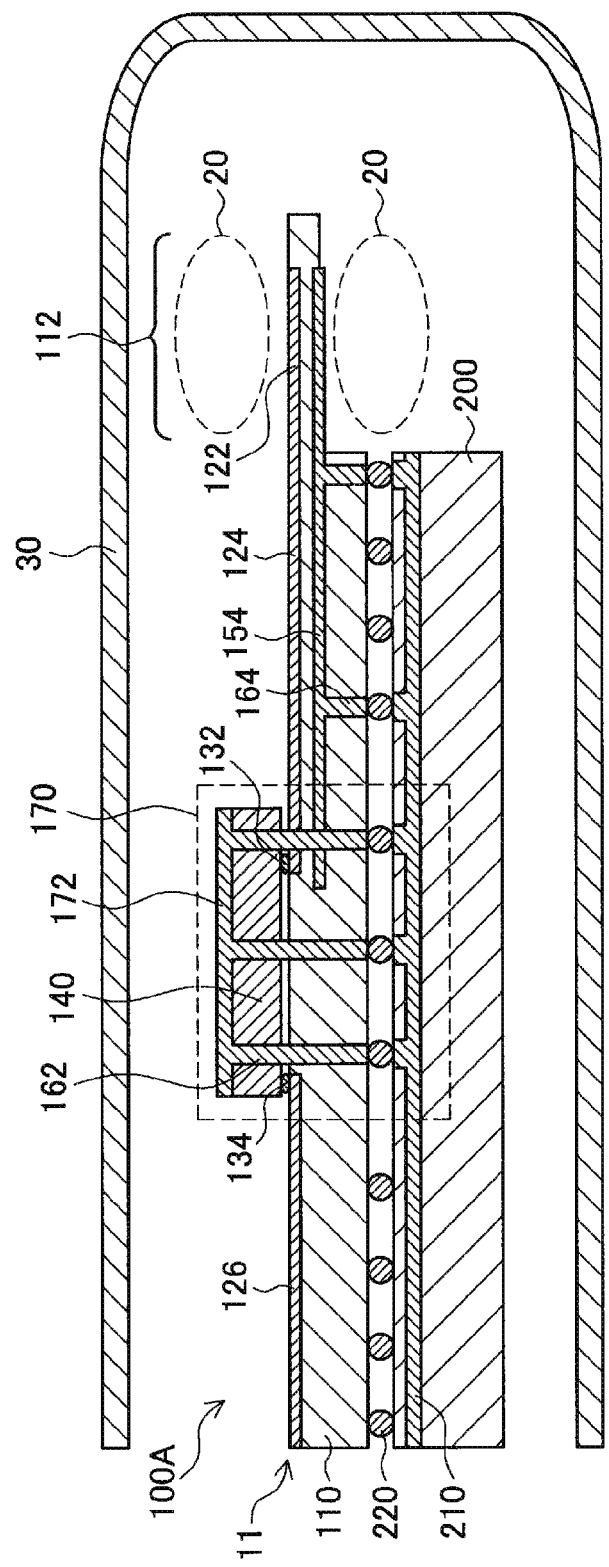
FIG. 6 is a cross-sectional view schematically illustrating a configuration of a communication device according to a modification example of this embodiment.

Herein, a modification example of the communication device according to the present embodiment will be described with reference to FIG. 6. FIG. 6 is a cross-sectional view schematically illustrating a configuration of a communication device 100A according to a modification example of the present embodiment.

As illustrated in FIG. 6, the communication device 100A according to the present modification example is different from the communication device 100 illustrated in FIG. 4 in that the device board 200 is not provided below the antenna portion 112.

The device board 200 existing in a space below the antenna portion 112 in the communication device 100 illustrated in FIG. 4 is not provided in the communication device 100A, and therefore it is possible to further reduce dielectric loss. Therefore, in the communication device 100A, it is possible to further improve radiation efficiency of a radio wave from the antenna portion 112.

3. THIRD EMBODIMENT

Figure 7:
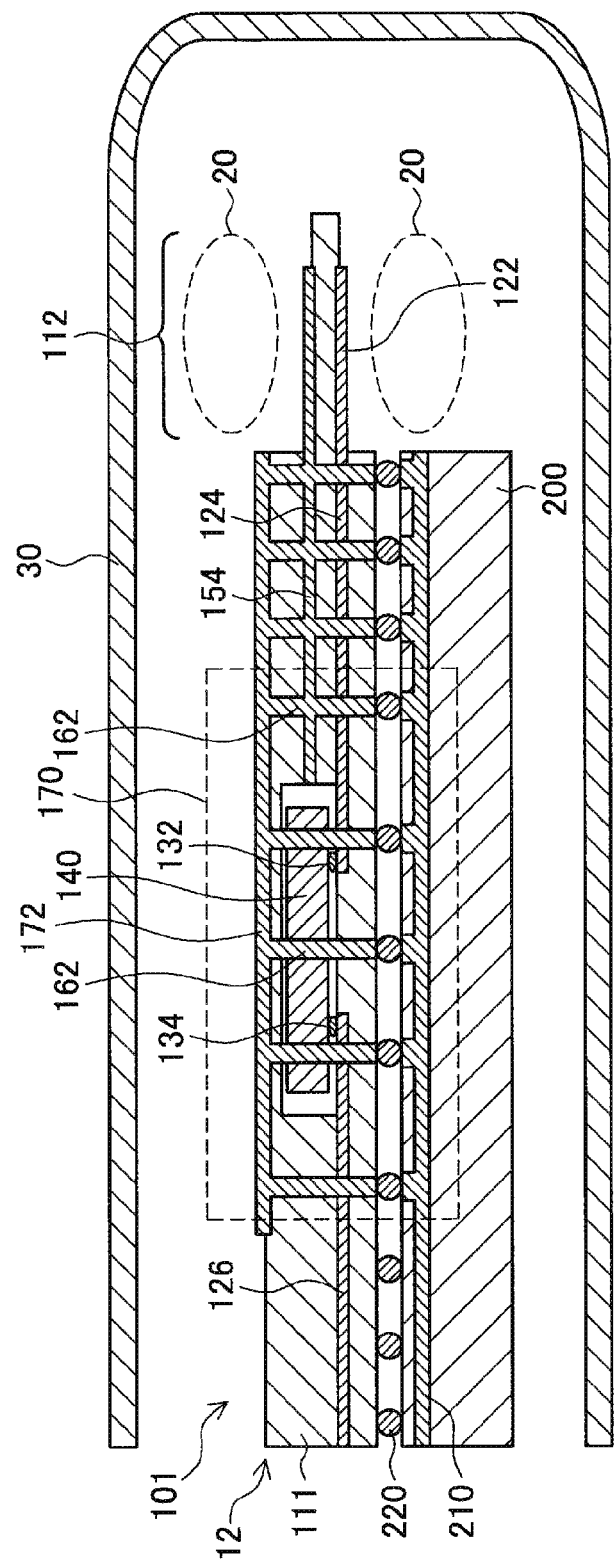
FIG. 7 is a cross-sectional view schematically illustrating a configuration of a communication device according to a third embodiment of the present disclosure.

Next, a configuration of a communication device 101 according to a third embodiment of the present disclosure will be described with reference to FIGS. 7 and 8. FIG. 7 is a cross-sectional view schematically illustrating the configuration of the communication device 101 according to the third embodiment of the present disclosure. Further, FIG. 8 is a plan view of the communication device 101 illustrated in FIG. 7 seen from a surface side opposite a surface on which the device board 200 is mounted.

Figure 8:
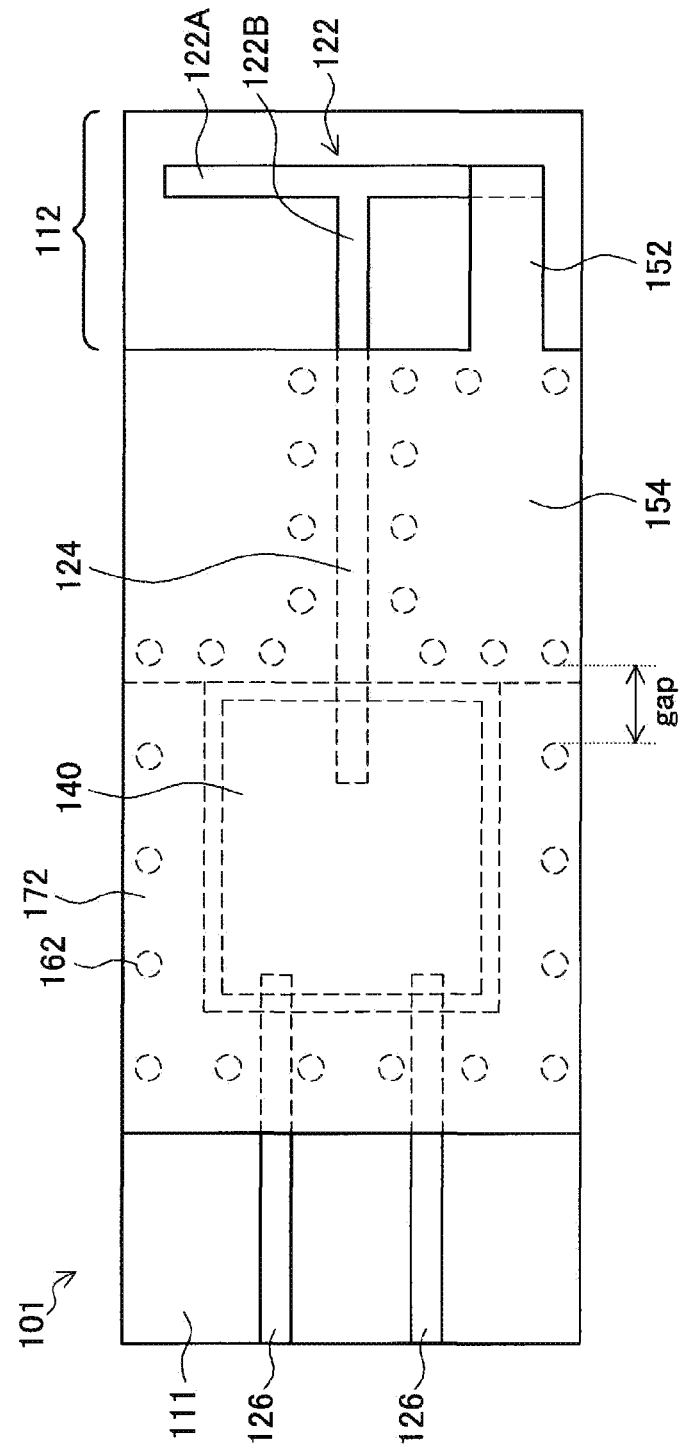
FIG. 8 is a plan view of the communication device illustrated in FIG. 7 seen from a surface side opposite a surface on which a device board is mounted.

As illustrated in FIGS. 7 and 8, the communication device 101 includes a high-frequency module 12 and the device board 200 on which the high-frequency module 12 is mounted. Further, the communication device 101 is included in, for example, the housing 30 of the terminal 1 that performs mobile communication.

The high-frequency module 12 includes a board 111, the antenna portion 112, the antenna element 122, the transmission line 124, the two pieces of connection wiring 132 and 134, the high-frequency element 140, the general wiring 126, the ground wiring 154, the ground vias 162, and the upper shield 172. Further, the device board 200 includes the board ground 210 and is connected to the high-frequency module 12 via the solders 220.

In the communication device 101 according to the present embodiment, the high-frequency element 140 is provided inside the board 111. Therefore, the upper shield 172 is provided on a surface of the board 111 opposite a surface on which the device board 200 is mounted, and the ground vias 162 are provided to penetrate the board 111 so as to surround the high-frequency element 140. In such a case, it is possible to control arrangement of the ground vias 162 more flexibly. With this, the ground vias 162 can also block out a radio wave to enter the transmission line 124.

Material and the like of each configuration in the third embodiment are substantially similar to those in the second embodiment, and therefore detailed description thereof is herein omitted. Hereinafter, characteristic configurations of the third embodiment will be mainly described.

The board 111 is a support on which each configuration of the high-frequency module 12 is provided. Further, the board 111 includes the high-frequency element 140 thereinside. Such the board 111 may be formed as, for example, a multilayer wiring board. Note that the board 111 may include a material similar to that in the first embodiment.

The antenna portion 112 is provided to project from the board 111 and is configured as an antenna capable of transmitting/receiving a radio wave in a high frequency band. In the present embodiment, the antenna element 122 (i.e. the main body portion 122A and the feeder line 122B) is provided on a surface on the device board 200 side, and the short-circuiting line 152 is provided on a surface opposite the surface on the device board 200 side.

Figure 9:
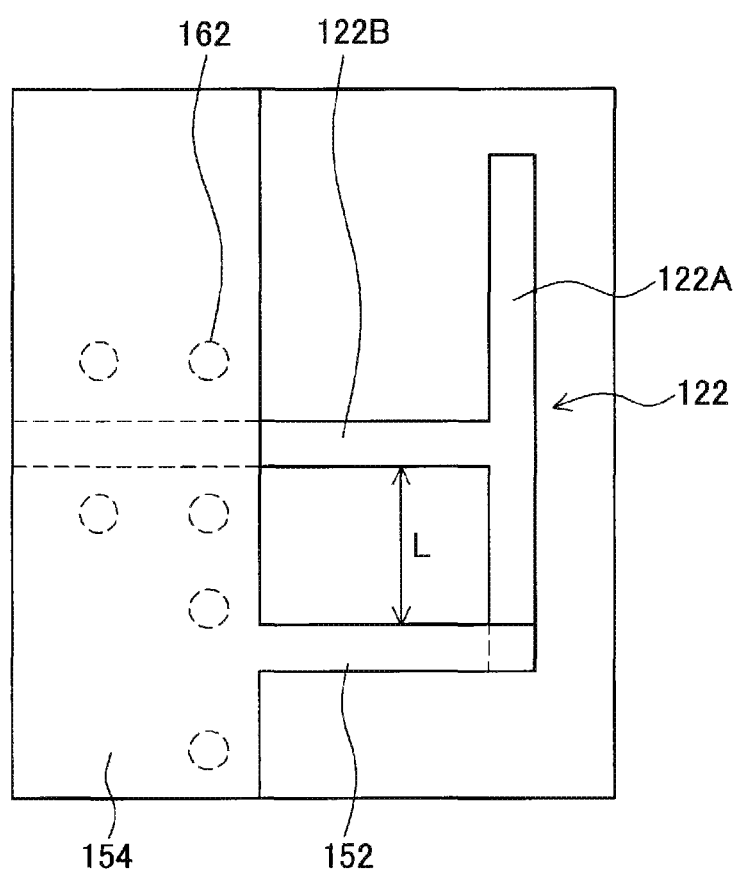
FIG. 9 is an enlarged view of an antenna portion illustrated in FIG. 8.

With this, in the communication device 101, it is possible to adjust impedance of the antenna portion 112 more easily. This point will be described with reference to FIG. 9. FIG. 9 is an enlarged view of the antenna portion 112 illustrated in FIG. 8.

As illustrated in FIG. 9, the antenna portion 112 is configured as, for example, a reverse F-shape antenna including the main body portion 122A, the feeder line 122B vertically connected to the substantially central portion of the main body portion 122A, and the short-circuiting line 152 penetrating the board 111 to be electrically connected to one end of the main body portion 122A.

In the reverse F-shape antenna, characteristics such as impedance are changed on the basis of thickness of the feeder line 122B and the short-circuiting line 152, a distance L between the feeder line 122B and the short-circuiting line 152, and the like. Therefore, because, in the antenna portion 112, the feeder line 122B or the short-circuiting line 152 is provided on a surface opposite a surface on which the device board 200 is mounted, it is possible to, after forming the feeder line 122B or the short-circuiting line 152, further process the feeder line 122B or the short-circuiting line 152 to perform impedance adjustment and the like.

For example, after the feeder line 122B or the short-circuiting line 152 is formed on the board 111, a shape thereof may be further processed by laser processing, a printing process, or the like. Further, the feeder line 122B or the short-circuiting line 152 may be formed to have a comparatively wide width as an impedance adjustment portion in preparation for processing the shape at the latter stage.

According to this, even in a case where a characteristic of the antenna portion 112 is changed from a desired characteristic due to a processing error or the like, it is possible to modify the characteristic of the antenna portion 112 to the desired characteristic by additionally processing the feeder line 122B or the short-circuiting line 152. Therefore, with such a configuration, it is possible to improve a yield in a manufacturing process of the communication device 101.

Note that, in a case where the antenna portion 112 is configured as an antenna having a structure other than a structure of the reverse F-shape antenna, the configuration of the impedance adjustment portion is different from the above-mentioned configuration. However, even in a case where the antenna portion 112 is configured as an antenna having any structure, the antenna portion 112 may be configured to adjust impedance from the surface side opposite the surface on which the device board 200 is mounted.

The transmission line 124 electrically connects the high-frequency element 140 and the antenna element 122 and supplies power to the antenna element 122. As in the second embodiment, the transmission line 124 may be formed on the same surface as the antenna element 122, may include the same material thereas, and may be simultaneously formed with the antenna element 122 and the general wiring 126 formed on the same surface by the same process.

The two pieces of connection wiring 132 and 134 electrically connect the high-frequency element 140 mounted inside the board 111 and the transmission line 124 or the general wiring 126 provided inside the board 111. For example, the two pieces of connection wiring 132 and 134 may be bumps, solders, vias, or the like, and the height of the two pieces of connection wiring 132 and 134 may be ¼ or less of the effective wavelength $\lambda_e$ of a radio wave transmitted/received by the antenna portion 112.

The high-frequency element 140 may be, for example, an electronic component including a circuit having a function of at least one of a high-frequency filter, a switch, a power amplifier, a low-noise amplifier, or the like as in the second embodiment.

Further, the high-frequency element 140 is surrounded by the shield portion 170 including the upper shield 172, the ground vias 162, and the board ground 210 in a cage shape. With this, the high-frequency element 140 is shielded by the shield portion 170 from an external radio wave, and therefore it is possible to restrain occurrence of noise in the circuit. Note that a radio wave blocked out by the shield portion 170 may be, for example, a radio wave transmitted/received by the antenna portion 112, a higher harmonic wave of the radio wave, or the like. Specifically, the shield portion 170 may block out a radio wave in a frequency band of 20 GHz to 200 GHz.

The general wiring 126 is various kinds of wiring electrically connected to the high-frequency element 140 by the connection wiring 134 as in the second embodiment. For example, the general wiring 126 may be formed on the same surface as the antenna element 122 and the transmission line 124, may include the same material thereas, and may be simultaneously formed with the antenna element 122 and the transmission line 124 formed on the same surface by the same process.

The ground wiring 154 is wiring connected to a reference potential (i.e. grounded). Specifically, the ground wiring 154 is grounded by being electrically connected to the board ground 210 by the ground vias 162 provided to penetrate the board 111 and the solders 220.

The ground vias 162 are provided to penetrate the board 111 and form the shield portion 170 together with the upper shield 172 and the board ground 210, thereby blocking out a radio wave to enter the high-frequency element 140. Specifically, the ground vias 162 are provided at intervals of the predetermined width gap or less so as to surround the high-frequency element 140. Further, the ground vias 162 may be provided at intervals of the predetermined width gap or less so as to surround the transmission line 124.

The size of the predetermined width gap is, for example, ¼ of the effective wavelength $\lambda_e$ of a radio wave to be blocked out by the shield portion 170 as described in the second embodiment. Further, in order to further improve the ability of the ground vias 162 blocking out radio waves, the size of the predetermined width gap may be 1/10 of the effective wavelength $\lambda_e$ of a radio wave to be blocked out. For example, in a case where the radio wave to be blocked out by the shield portion 170 is a radio wave in a frequency band of 20 GHz to 100 GHz, the size of the predetermined width gap may be set to 0.75 mm and may desirably be set to 0.3 mm.

Because the ground vias 162 are provided at such intervals of the predetermined width gap or less, the ground vias 162 can block out a radio wave to enter the high-frequency element 140 through a side surface. Further, the ground vias 162 can block out a radio wave to enter the transmission line 124 through the side surface.

The upper shield 172 is a conductor layer provided on a surface of the board 111 opposite a surface on which the device board 200 is mounted (i.e. an upper surface of the board 111). The upper shield 172 is provided on the whole upper surface of the board 111, and therefore it is possible to block out a radio wave to enter the high-frequency element 140 and the transmission line 124 through the upper surface.

The device board 200 is a support on which each configuration of the communication device 101 including the high-frequency module 12 is mounted. Note that the device board 200 does not need to be provided below the antenna portion 112. In such a case, in the communication device 101, it is possible to reduce dielectric loss in a space above and below the antenna portion 112, and therefore it is possible to further improve radiation efficiency of a radio wave from the antenna portion 112.

The solders 220 electrically connect wiring formed on the high-frequency module 12 and wiring formed on the device board 200. Specifically, the solders 220 electrically connect the ground vias 162 and the board ground 210.

The board ground 210 is wiring provided on the device board 200 and connected to a reference potential (i.e. grounded). The ground vias 162, the upper shield 172, and the ground wiring 154 are grounded by being electrically connected to the board ground 210. Further, the board ground 210 surrounds the high-frequency element 140 and the like together with the ground vias 162 and the upper shield 172 in a cage shape and therefore functions as the shield portion 170 that blocks out a radio wave to enter the high-frequency element 140.

The communication device 101 including the configurations described in the above description includes the non-directional antenna portion 112 as in the communication device 100 according to the second embodiment. Further, the communication device 101 has low loss caused by a transmission path and can transmit/receive a radio wave in a high frequency band more efficiently.

Note that the above-mentioned communication device 101 can be manufactured by using a general manufacturing technology of electronic components. Such a general manufacturing technology of electronic components is obvious to a so-called person skilled in the art, and therefore description thereof is herein omitted.

4. CONCLUSION

As described in the above description, a high-frequency module and a communication device according to an embodiment of the present disclosure include a non-directional antenna and can transmit/receive a radio wave in a high frequency band. Further, the high-frequency module and the communication device according to the embodiment of the present disclosure can be formed so that a transmission path from an antenna element to a high-frequency element is shorter so as to cause no impedance mismatch. Therefore, the high-frequency module and the communication device according to the embodiment of the present disclosure can reduce power loss in the transmission path and can therefore transmit/receive a radio wave in a high frequency band more efficiently.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A high-frequency module including:

an antenna portion provided to project from a board;

an antenna element at least a part of which is provided on the antenna portion;

a transmission line formed on a same surface as the antenna element and including a same material as the antenna element; and a high-frequency element mounted on a surface of the board on which the transmission line is formed.

(2)

The high-frequency module according to (1), in which the high-frequency element is surrounded by a shield portion that blocks out a radio wave.

(3)

The high-frequency module according to (2), in which the shield portion includes an upper shield provided on a surface of the high-frequency element opposite a surface via which the high-frequency element is mounted on the board, a plurality of ground vias that penetrates the high-frequency element and the board, and ground wiring connected to the ground vias.

(4)

The high-frequency module according to (3), in which each interval between the plurality of ground vias is ¼ or less of an effective wavelength of the radio wave to be blocked out by the shield portion.

(5)

The high-frequency module according to any one of (2) to (4), in which the high-frequency element and the transmission line are electrically connected via connection wiring, and a length of the connection wiring is ¼ or less of an effective wavelength of the radio wave to be blocked out by the shield portion.

(6)

The high-frequency module according to any one of (2) to (5), in which the radio wave to be blocked out by the shield portion is a radio wave transmitted/received by the antenna element and a higher harmonic wave of the radio wave.

(7)

The high-frequency module according to any one of (2) to (6), in which the shield portion further surrounds the transmission line.

(8)

The high-frequency module according to any one of (1) to (7), in which a radio wave transmitted/received by the antenna element is a high-frequency radio wave of 20 GHz to 100 GHz.

(9)

The high-frequency module according to any one of (1) to (8), in which an air region is provided above and below the antenna portion.

(10)

The high-frequency module according to any one of (1) to (9), in which the antenna portion is configured as a reverse F-shape antenna.

(11)

A communication device including:

an antenna portion provided to project from a board;

an antenna element at least a part of which is provided on the antenna portion;

a transmission line formed on a same surface as the antenna element and including a same material as the antenna element;

a high-frequency element mounted on a surface of the board on which the transmission line is formed; and a device board provided on a surface of the board opposite the surface on which the high-frequency element is formed.

(12)

The communication device according to (11), in which the high-frequency element is surrounded by a shield portion that blocks out a radio wave, and the shield portion includes an upper shield provided on a surface of the high-frequency element opposite a surface via which the high-frequency element is mounted on the board, a plurality of ground vias that penetrates the high-frequency element and the board, and a board ground connected to the ground vias and provided on the device board.

(13)

The communication device according to (12), in which the board ground is not provided in a region below the antenna portion.

(14)

The communication device according to any one of (11) to (13), in which the device board is not provided in a region below the antenna portion.

(15)

The communication device according to any one of (11) to (14), in which an impedance adjustment portion is further provided on a surface of the antenna portion on a side opposite a side on which the device board is provided.

REFERENCE SIGNS LIST 10, 11, 12 high-frequency module
20 air region
30 housing
100, 101 communication device
110, 111 board
112 antenna portion
122 antenna element
124 transmission line
126 general wiring
132, 134 connection wiring
140 high-frequency element
150, 154 ground wiring
162, 164 ground via
170 shield portion
172 upper shield
200 device board
210 board ground
220 solder

The invention claimed is:

1. A high-frequency module, comprising:
an antenna portion configured to project from a board;
an antenna element on a first surface of the board, wherein at least a part of the antenna element is on the antenna portion;
a transmission line on the first surface of the board, wherein the transmission line includes a material same as a material of the antenna element; and
a high-frequency element on the first surface of the board, wherein
the high-frequency element is surrounded by a shield portion configured to block out a radio wave, and
the shield portion includes:
an upper shield on a first surface of the high-frequency element, wherein the first surface of the high-frequency element is opposite to a second surface of the high-frequency element via which the high-frequency element is mounted on the board;
a plurality of ground vias that penetrates the high-frequency element and the board; and
a ground wiring connected to the plurality of ground vias.

2. The high-frequency module according to claim 1, wherein an interval between each of the plurality of ground vias is ¼ or less of an effective wavelength of the radio wave.

3. The high-frequency module according to claim 1, wherein
the high-frequency element and the transmission line are electrically connected via a connection wiring, and
a length of the connection wiring is ¼ or less of an effective wavelength of the radio wave.

4. The high-frequency module according to claim 1, wherein
the radio wave is a first radio wave and a higher harmonic wave of the first radio wave, and
the antenna element is configured to transmit or receive the first radio wave.

5. The high-frequency module according to claim 1, wherein the shield portion further surrounds the transmission line.

6. The high-frequency module according to claim 1, wherein
the antenna element is configured to transmit or receive a first radio wave, and
the first radio wave is a high-frequency radio wave of 20 GHz to 100 GHz.

7. The high-frequency module according to claim 1, wherein the high-frequency module further comprises an air region above and below the antenna portion.

8. The high-frequency module according to claim 1, wherein the antenna portion is configured as a reverse F-shape antenna.

9. A communication device, comprising:
an antenna portion configured to project from a board;
an antenna element on a first surface of the board, wherein at least a part of the antenna element is on the antenna portion;
a transmission line on the first surface of the board, wherein the transmission line includes a material same as a material of the antenna element;
a high-frequency element on the first surface of the board, wherein
the high-frequency element is surrounded by a shield portion configured to block out a radio wave,
the shield portion includes:
an upper shield on a first surface of the high-frequency element, wherein the first surface of the high-frequency element is opposite to a second surface of the high-frequency element via which the high-frequency element is mounted on the board;
a plurality of ground vias that penetrates the high-frequency element and the board; and
a board ground connected to the plurality of ground vias; and
a device board on a second surface of the board opposite to the first surface of the board.

10. The communication device according to claim 9, wherein the board ground is not provided in a region below the antenna portion.

11. The communication device according to claim 9, wherein the device board is not provided in a region below the antenna portion.

12. The communication device according to claim 9, wherein the communication device further comprises an impedance adjustment portion is further on a surface of the antenna portion on a first side opposite to a second side on which the device board is provided.

* * * * *